United States Patent
Fujii

(10) Patent No.: US 6,883,877 B2
(45) Date of Patent: Apr. 26, 2005

(54) CABINET FIXING STRUCTURE

(75) Inventor: Haruhiko Fujii, Osaka (JP)

(73) Assignee: Funai Electric Co., Ltd. (JP)

( * ) Notice: Subject to any disclaimer, the term of this patent is extended or adjusted under 35 U.S.C. 154(b) by 0 days.

(21) Appl. No.: 10/458,977

(22) Filed: Jun. 11, 2003

(65) Prior Publication Data

US 2003/0230954 A1 Dec. 18, 2003

(30) Foreign Application Priority Data

Jun. 13, 2002 (JP) .................................. 2002-003574 U

(51) Int. Cl.$^7$ .............................................. A47B 81/06
(52) U.S. Cl. ...................................... 312/7.2; 348/836
(58) Field of Search .............................. 312/7.2, 223.1, 312/223.2; 248/917, 918; 361/681, 682; 348/825, 836

(56) References Cited

U.S. PATENT DOCUMENTS 5,699,132 A * 12/1997 Adachi et al. .............. 348/836
6,233,026 B1 * 5/2001 Kim et al. .................. 348/836

FOREIGN PATENT DOCUMENTS

JP          6-62348    *   3/1994
JP       2000-101952    *   4/2000

OTHER PUBLICATIONS

Japanese Unexamined Utility Model Publication No. 61–166669 dated Oct. 16, 1986 (10 pp.).
Japanese Unexamined Utility Model Publication No. 4–19084 dated Feb. 18, 1992 (10 pp.).

* cited by examiner

*Primary Examiner*—James O. Hansen
(74) *Attorney, Agent, or Firm*—Osha & May L.L.P.

(57) ABSTRACT

In a cabinet fixing structure, a holder provided in a fixing portion of a rear cabinet is formed with a pair of notches extending along a fitting direction, while a boss provided in a fixing portion of a front cabinet is formed with a pair of rail ribs engaging the notches. The holder is fitted with the boss and the rail ribs are engaged with the notches, so that the holder is fixed to the boss with respect to the rotational direction of the screw, with a tightening torque applied to the boss being distributed over the holder.

4 Claims, 5 Drawing Sheets

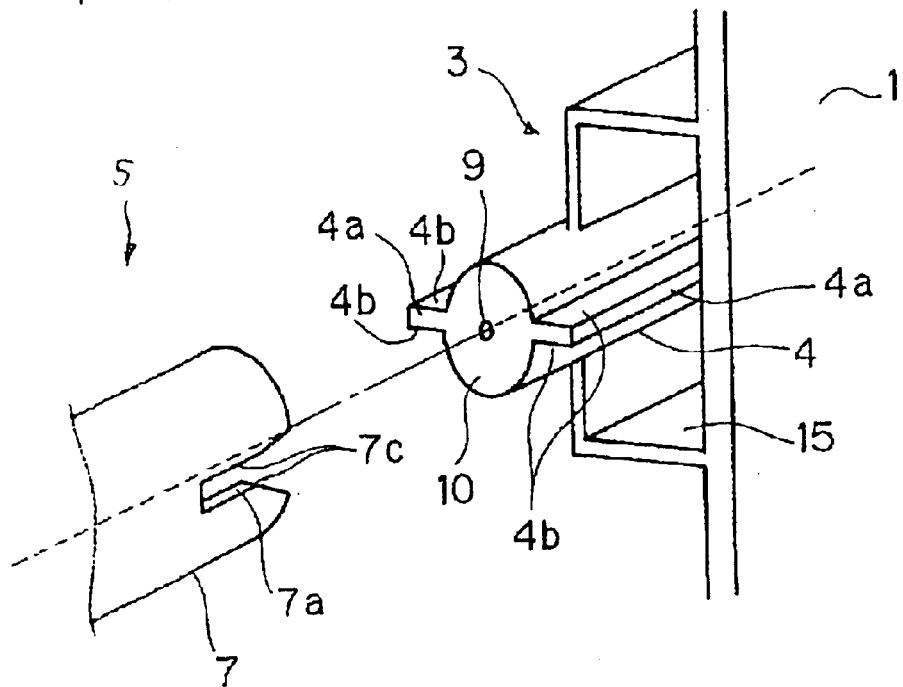
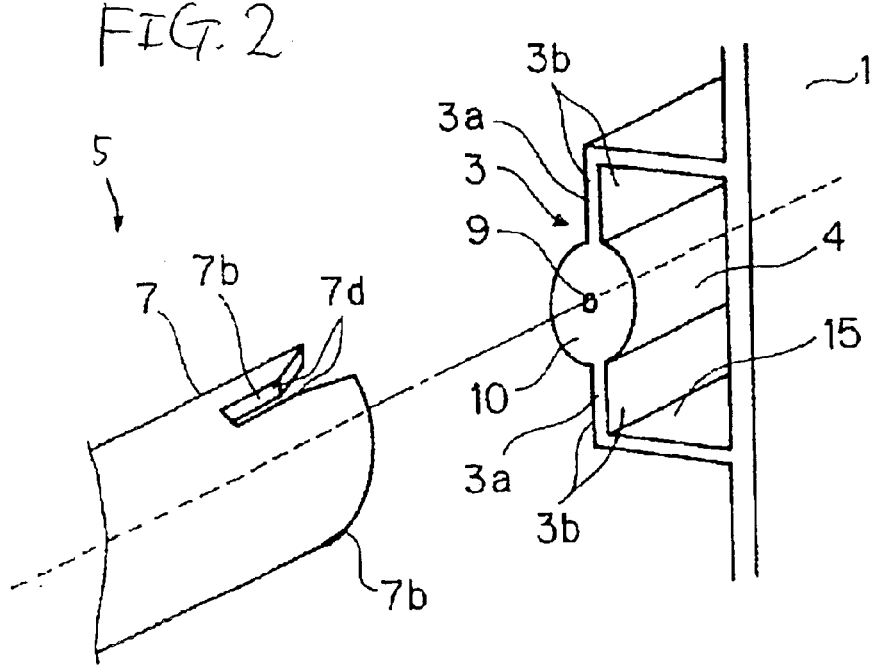

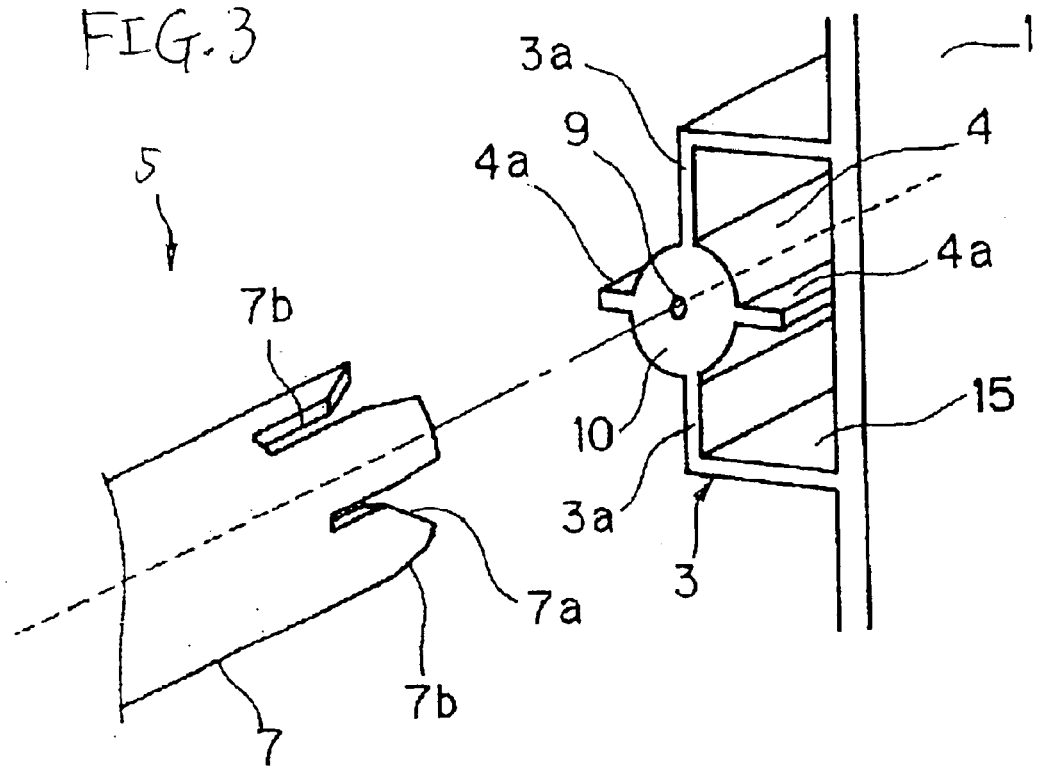

PRIOR ART

PRIOR ART

CABINET FIXING STRUCTURE

The present disclosure relates to the subject matter contained in Japanese Utility Model Application No. 2002-003574 filed Jun. 13, 2002, which is incorporated herein by reference in its entirety.

BACKGROUND OF THE INVENTION

1. Field of the Invention

The present invention relates to a cabinet fixing structure for a television receiver or the like, and more particularly to an improved cabinet fixing structure in which deformation of a cabinet in tightening a screw is reduced.

2. Description of the Related Art

Generally, a box-like resin cabinet for a television receiver or a CRT monitor consists of a front cabinet and a rear cabinet that are built up by screws. In this case, a holder provided in the rear cabinet is fitted with a boss provided in the front cabinet, with a screw being engaged via the holder of the rear cabinet into the boss of the front cabinet. FIGS. 4b to 6 schematically show the cabinet fixing structures of this type.

FIG. 4b is a perspective view of the conventional cabinet fixing structure, FIG. 5 is an enlarged view of the essence thereof, and FIG. 6 is a side cross-sectional view of a fixing portion for the rear cabinet. These figures show a television receiver, in which a plurality of fixing portions 3 are provided in the front cabinet (first cabinet) 1, and a plurality of fixing portions 5 are provided in the rear cabinet (second cabinet) 5. The plurality of fixing portions 3 and 5 are provided on an inner wall of each cabinet to face an opening of each cabinet. The fixing portion 3 of the front cabinet 1 is formed with a columnar boss 4 jutting rearward.

The fixing portion 5 of the rear cabinet 2 is formed with a cylindrical holder 7 extending forward from an inner wall face of the rear cabinet 2. The front cabinet and the rear cabinet are positioned in advance so that the holder 7 and the boss 4 are opposed to each other in attaching the rear cabinet 2 to the front cabinet 1. A concave portion 11 is formed by recessing the rear cabinet 2 at the back of the fixing portion 5. A bottom portion 12 of the holder 7 is faced with this concave portion 11.

When the rear cabinet 2 is moved in a direction of the arrow as shown in FIG. 4b, the boss 4 is fitted into the holder 7, so that a top end face 13 of the holder 7 comes into contact with an end face of the fixing portion 3, and a top end face 10 of the boss 4 comes into contact with the bottom portion 12 in the holder 7, whereby the rear cabinet 2 is stopped in movement to enable the openings of the cabinets 1 and 2 to be abutted with each other.

Then, a screw 6 is inserted through a tapped hole 8 provided on the bottom portion 12 of the holder 7 from the backside of the rear cabinet 3, and engaged into the tapped hole 9 of the boss 4, whereby the fixing of the rear cabinet 2 to the front cabinet 1 is completed.

With this conventional cabinet fixing structure, when the rear cabinet 2 is fixed to the front cabinet 1 by tightening the screw 6, the holder 7 externally fitted with the boss 4 is not secured with the boss 4 in the rotational direction of the screw 6. Thus, a tightening torque in tightening the screw is not transmitted to the holder but only to the boss 4 via the screw 6, and transmitted via the fixing portion 3 to the front cabinet 1, so that the front cabinet 1 is flexed due to the tightening torque of the screw 6 to cause a distortion around the fixing portion (see a deformed portion 14 in FIG. 7).

Such a distortion likely causes defective in appearance. Also, after a high temperature endurance test in view of transportation conditions, a slight distortion caused around the fixing portion of the cabinet due to the tightening torque of the screw 6 is made larger by heating.

JP-UM-A-4-19084 discloses a cabinet fixing device. This device has a structure of attaching the rear cabinet via a attaching piece to the front cabinet to facilitate the fixing of the rear cabinet to the front cabinet. Accordingly, this device has a different constitution from that of this invention, but does not prevent the cabinet from being deformed in tightening the screw.

SUMMARY OF THE INVENTION

Thus, this invention has been achieved in the light of the above-mentioned problems, and it is an object of the invention to provide a cabinet fixing structure in which the cabinet is prevented from being deformed, when fixed by tightening the screw.

In order to achieve the above object, the present invention provides a cabinet fixing structure having: first and second cabinets; a holder provided in the second cabinet; a boss provided in the first cabinet with which the holder is fitted; a screw inserted from the opposite side of fitting the holder with the boss and engaged via the holder into the boss to fix the second cabinet to the first cabinet; and fixing means for fixing the holder fitted with the boss with respect to a rotational direction of the screw, the fixing means provided in the boss and/or the holder.

With this constitution, since the holder is fixed to the boss with respect to the rotational direction of the screw, a tightening torque is transmitted via fixing means not only to the boss but also to the holder, when fixing the second cabinet to the first cabinet by tightening the screw. Therefore, the tightening torque is received by both the first cabinet and the second cabinet, and fully distributed, whereby the cabinet is prevented from being flexed and distorted.

More specifically, the fixing means may be a pair of notches provided in the holder engaging a fixing member of the boss. Or the holder may be provided with notches, and the boss is provided with ribs for fixing the holder with respect to the rotational direction of the screw by engaging the notches in fitting the holder with the boss. Or the holder may be cylindrical, and provided with a pair of notches along the fitting direction of the holder, and the boss may be molded integrally with a pair of rail ribs projecting sideways from both side faces along the fitting direction of the boss, the pair of rail ribs serving to fix the holder with respect to the rotational direction of the screw by engaging the notches in fitting the holder with the boss.

BRIEF DESCRIPTION OF THE DRAWINGS

FIG. 1 is a perspective view of the essence of a cabinet fixing structure according to a first embodiment of the present invention;

FIG. 2 is a perspective view of the essence of a cabinet fixing structure according to a second embodiment of the invention;

FIG. 3 is a perspective view of the essence of a cabinet fixing structure according to a third embodiment of the invention;

DETAILED DESCRIPTION OF THE PREFFERED EMBODIMENTS

Figure 4A:
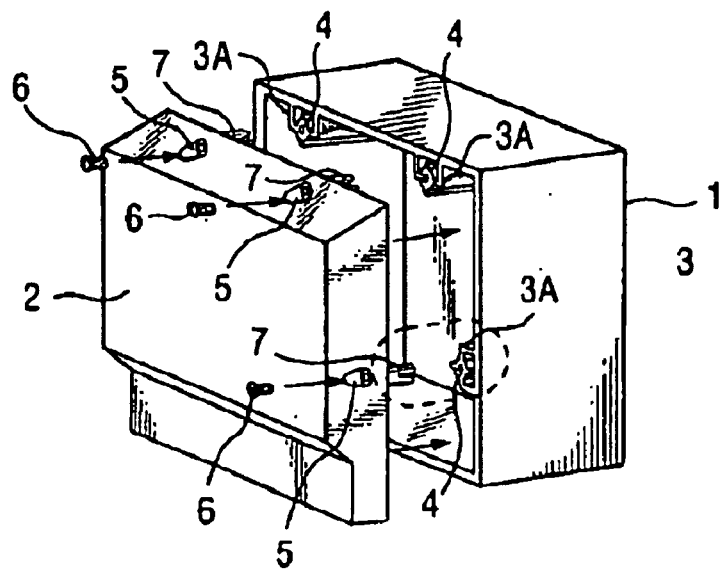
FIG. 4a is a perspective view of an embodiment of the cabinet fixing structure.

The preferred embodiments of the present invention will be described below with reference to the accompanying drawings. FIG. 1 is a perspective view of the essence of a cabinet fixing structure according to a first embodiment of the invention. As shown in FIG. 1, a cylindrical boss 4 provided in a fixing portion 3 of a front cabinet 1 is formed integrally with a pair of rail ribs 4*a* projecting both sideways along the fitting direction in this embodiment.

The fixing portion 3 includes the boss 4 and a support member 15. The support member 15 faces an opening of the front cabinet 1 and projects from an inner wall face of the front cabinet. The support member 15 has a cross sectional shape of letter "U". The boss 4 is formed in a central portion of a parallel plate, which is parallel to the inner wall face of the front cabinet 1, of the support member 15. A top end portion of the boss 4 juts rearward in the fitting direction together with the rail ribs 4*a* from the support member 15. A tapped hole 9 is provided in the center of a top end face 10 of the boss 4. The fixing portion 3 is molded integrally with the front cabinet 1.

On the other hand, a cylindrical holder 7 extending forward in a fixing portion 5 of a rear cabinet 2 are formed with a pair of notches 7*a* engaging the rail ribs 4*a* when fitted with the boss 4. The notches 7*a* are slightly wider near an entrance at the top end of the holder 7, and extend rearward in the fitting direction by the substantial same length as the top end portion of the boss 4 jutting from the support member 15 in the fitting direction. The inner diameter of the holder 7 is almost equal to the outer diameter of the boss 4.

In fixing the rear cabinet 2 to the front cabinet 1, first of all, the rear cabinet 2 is moved in the fitting direction of the holder 7 to externally fit the holder 7 with the boss 4. When the holder 7 is fitted with the boss 4, the rail ribs 4*a* are engaged with the notches 7*a*, so that the top end face of the holder 7 comes into contact with the support member 15, and the top end face 10 of the rail ribs 4*a* comes into contact with the bottom of the notches 7*a*, whereby the movement of the rear cabinet 2 is stopped.

Figure 5:
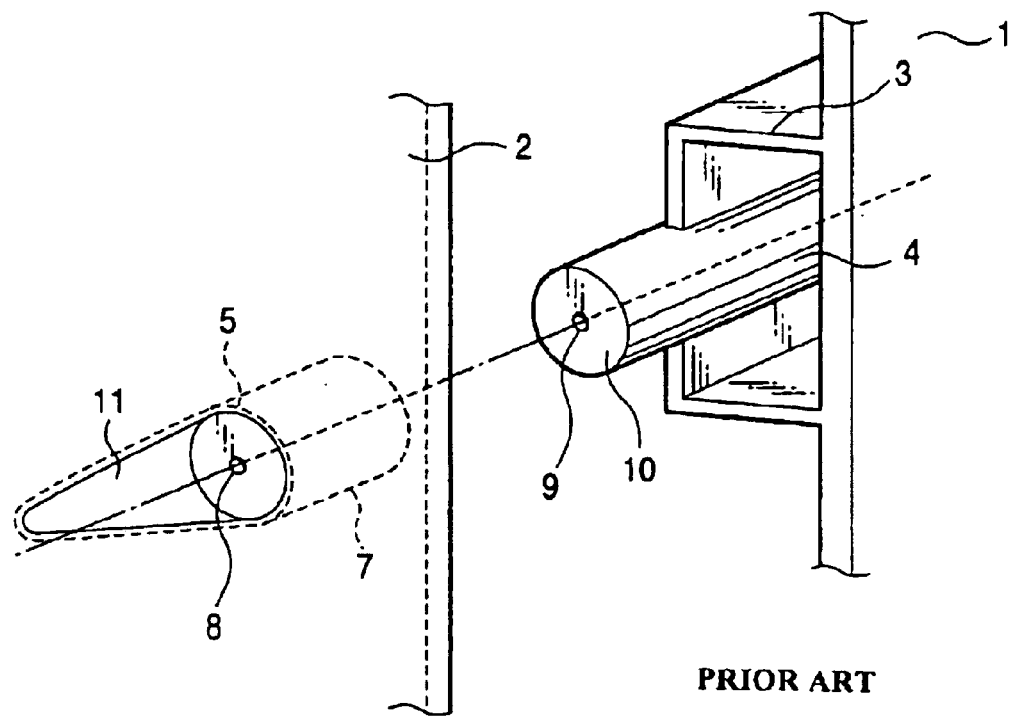
FIG. 5 is an enlarged view of the essence of the fixing structure as shown in FIG. 4*b;*
Figure 6:
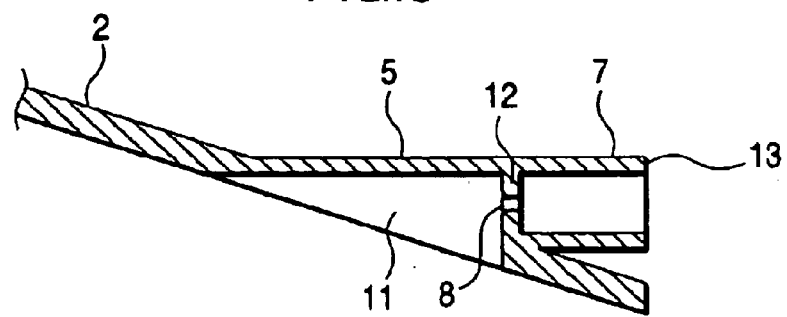
FIG. 6 is a cross-sectional view of the fixing structure as shown in FIG. 4*b*.
Figure 7:
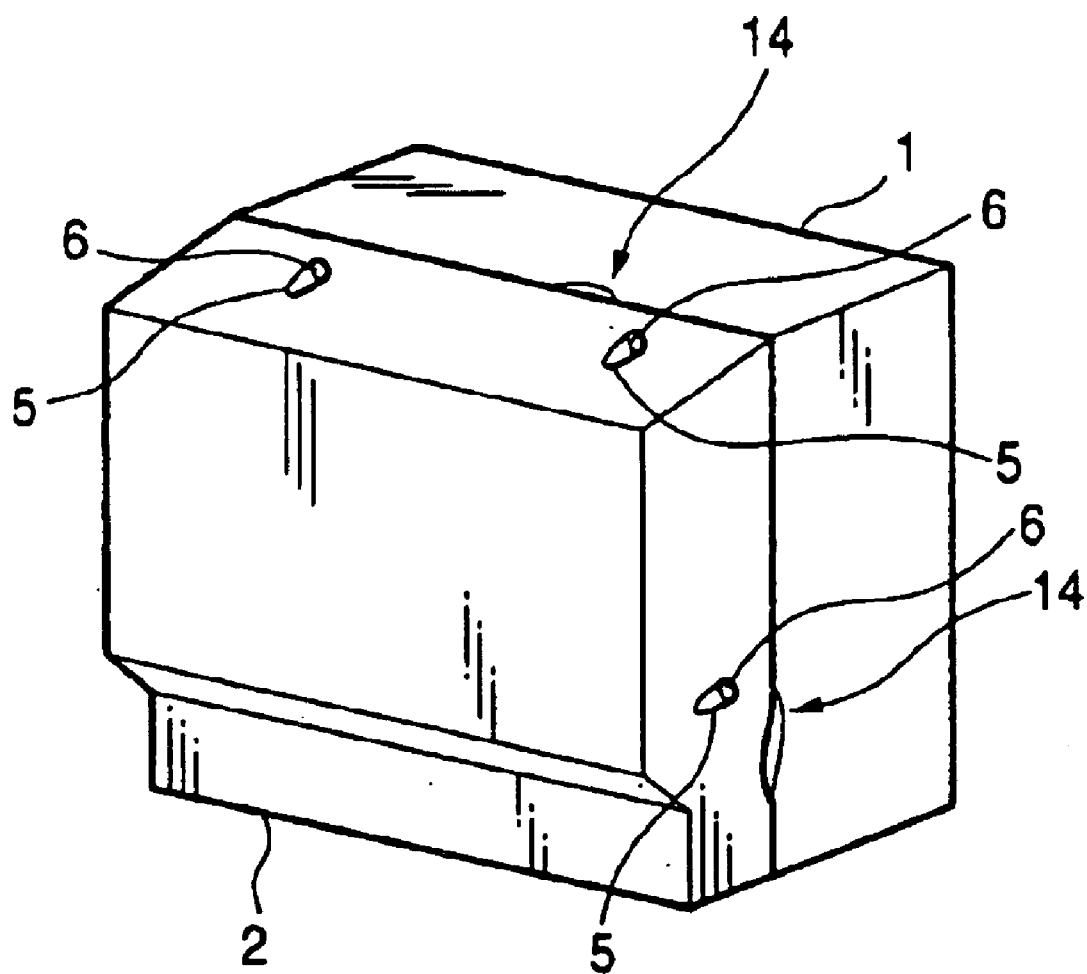
FIG. 7 is an explanatory view of the fixing structure as shown in FIG. 4*b*.

At this time, the side portions 4*b* of the rail ribs 4*a* is in contact with the side faces 7*c* of the notches 7*a*, so that the holder 7 is fixed to the boss 4 with respect to the rotational direction of a screw 6. In this state, the screw 6 is engaged, whereby the fixing of the rear cabinet 2 to the front cabinet 1 is completed. The other constitution is the same as the conventional cabinet fixing structure as previously described. Thus the same numerals are attached to the same or like parts corresponding to the fixing structure of FIGS. 4 to 6.

In this manner, when fixing the rear cabinet 2 to the front cabinet 1 by tightening the screw 6, a tightening torque of the screw 6 to be applied to the boss 4 is transmitted to the rail ribs 4*a*, and to the holder 7 via the notches 7*a* with which the rail ribs 4*a* make contact, because the holder 7 is fixed to the boss 4 with respect to the rotational direction of the screw 6. Therefore, the tightening torque of the screw 6 is distributed via the fixing portions of the boss 4 and the holder 7 over both the front cabinet 1 and the rear cabinet 2, whereby the cabinet has a greater strength against the tightening torque, and is prevented from being flexed in tightening the screw.

Accordingly, the product does not produce a distortion around the fixing portion of cabinet, and is more pleasing in outward appearance, and less likely becomes defective, whereby the cabinet fixing structure having excellent resistance without deformation against high temperatures during the transportation is obtained.

Another embodiment of the invention will be described below. FIG. 2 is a perspective view of the essence of the cabinet fixing structure according to a second embodiment of the invention. In this embodiment, a boss 4 of a fixing portion 3 in the front cabinet 1 does not jut from a support member 15 in the fitting direction and does not have rail ribs. A holder 7 of a fixing portion 5 in the rear cabinet 2 is provided with a pair of notches 7*b* extending in the fitting direction for engaging with a parallel plate 3*a* of the support member 15.

The boss 4 is integrally formed in the center of the parallel plate 3*a*, which is parallel to the inner wall face of the front cabinet 1, and extends forward. The top end face 10 of the boss 4 and the end face of the parallel plate 3*a* are flush with an opening of the front cabinet 1. Since the boss 4 does not jut in the fitting direction, the holder 7 is lengthened in the fitting direction to some extent. This second embodiment is different in these points from the first embodiment. The other constitution is the same as in the first embodiment as shown in FIG. 1.

Since the side portions 3*b* of the parallel plate 3*a* comes into contact with the side faces 7*d* of the notches 7*b* in the above manner, the holder 7 is fixed to the boss 4 with respect to the rotational direction of the screw 6, whereby the cabinet is prevented from being flexed and deformed due to a tightening torque, resulting in the advantage that the structure of the boss 4 is as simple as the conventional one.

FIG. 3 is a perspective view of the essence of the cabinet fixing structure according to a third embodiment of the invention.

This third embodiment as shown in FIG. 3 has a combined structure of the first and second embodiments. A boss 4 integrally formed in the center of a parallel plate 3*a* and extending forward is provided with a pair of rail ribs 4*a*. The rail ribs projects sideways from both side faces of the boss 4 along the fitting direction. The parallel plate 3*a* and the rail ribs 4*a* defines an angle about 90 degrees. The top end face 10 of the boss 4 and the end face of the support member 15 are flush with the opening of the front cabinet 1.

The holder 7 has four notches including a pair of notches 7*b* engaging the parallel plate 3*a* and a pair of notches 7*a* engaging the rail ribs 4*a* along the fitting direction.

Figure 4B:
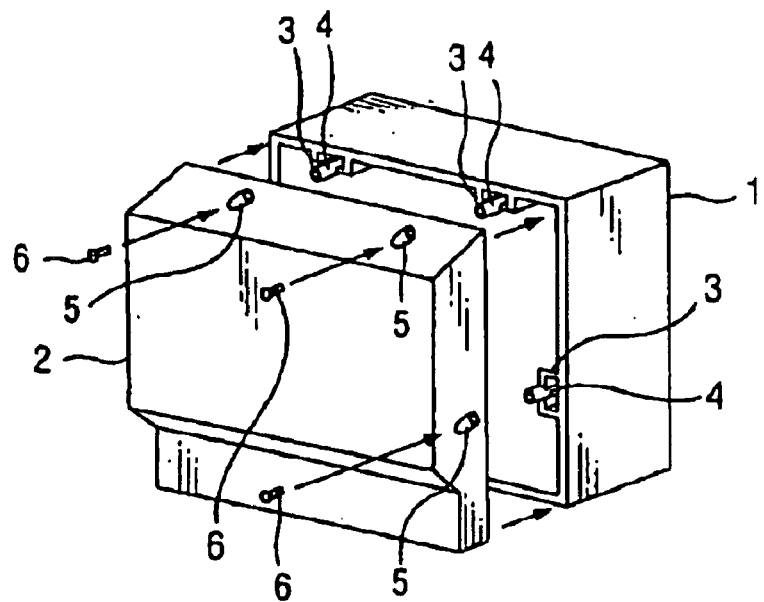
FIG. 4b is a perspective view of the conventional cabinet fixing structure.

When the holder 7 is externally fitted with the boss 4 and the notches 7*a* and 7*b* are engaged with the parallel plate 3*a* and the rail ribs 4*a*, the holder 7 is fixed to the boss 4 in four portions, whereby the holder 7 is fixed more firmly with respect to the rotational direction of the screw 6 than in the first and second embodiments where the holder is fixed in two portions. Thus, the cabinet is securely prevented from being deformed due to tightening torque of the screw 6 in fixing the cabinet. FIG. 4*a* shows an embodiment of the invention, like that show in FIG. 3, implemented in a front cabinet 1 and a rear cabinet 2, and provided with a screw 6 to fix the rear cabinet 2 to the front cabinet 1.

As described above, the cabinet fixing structure of this invention is provided with fixing means for locking the holder with the boss against the rotational direction of screw, a tightening torque is distributed when fixing the cabinet by tightening the screw, whereby the cabinet is prevented from being flexed, distorted or deformed. More specifically, the fixing means may be notches provided in the holder, or ribs provided in the boss to engage the notches of the holder, whereby the holder is securely fixed against the rotational direction of screw with a relatively simple structure.

What is claimed is:

1. A cabinet fixing structure comprising:

a resin cabinet including a front cabinet and a rear cabinet;

a support member projectingly formed on an inner wall of the front cabinet and facing an opening of the front cabinet;

a columnar boss jutting rearward from the support member;

a cylindrical holder extending forward from an inner wall side of a concave portion recessed on the rear cabinet; and a screw inserted from the back of the holder externally fitting with the boss and engaged via the holder into the boss to fix the rear cabinet to the front cabinet, wherein the holder has a pair of notches extending along a fitting direction of the holder, and the boss is molded integrally with a pair of rail ribs for fixing the holder with respect to a rotational direction of the screw by engaging with the notches in fitting the holder with the boss, the rail ribs projecting sideways from both side faces of the boss along the fitting direction of the boss.

2. A cabinet fixing structure comprising:

first and second cabinets;

a holder provided in the second cabinet;

a boss provided in the first cabinet with which the holder is fitted;

a screw inserted from the opposite side of the holder fitted with the boss and engaged via the holder into the boss to fix the second cabinet to the first cabinet; and fixing means for fixing the holder fitted with the boss with respect to a rotational direction of the screw, wherein the fixing means is a pair of notches provided in the holder engaging a support member supporting the boss.

3. A cabinet fixing structure comprising:

first and second cabinets;

a holder provided in the second cabinet;

a boss provided in the first cabinet with which the holder is fitted;

a screw inserted from the opposite side of the holder fitted with the boss and engaged via the holder into the boss to fix the second cabinet to the first cabinet; and fixing means for fixing the holder fitted with the boss with respect to a rotational direction of the screw, the fixing means provided in the boss and the holder, wherein the holder is provided with notches, and the boss is provided with ribs for fixing the holder with respect to the rotational direction of the screw by engaging the notches in fitting the holder with the boss.

4. A cabinet fixing structure comprising:

first and second cabinets;

a holder provided in the second cabinet;

a boss provided in the first cabinet with which the holder is fitted;

a screw inserted from the opposite side of the holder fitted with the boss and engaged via the holder into the boss to fix the second cabinet to the first cabinet; and fixing means for fixing the holder fitted with the boss with respect to a rotational direction of the screw, the fixing means provided in the boss and the holder, wherein the holder is cylindrical, and provided with a pair of notches extending along the fitting direction of the holder, and the boss is molded integrally with a pair of rail ribs projecting sideways from both side faces along the fitting direction of the boss, the pair of rail ribs serving to fix the holder with respect to the rotational direction of the screw by engaging the notches in fitting the holder with the boss.

* * * * *